Dec. 1, 1931.   G. C. CHASE ET AL   1,834,121
CALCULATING MACHINE
Filed Nov. 20, 1929   10 Sheets-Sheet 3
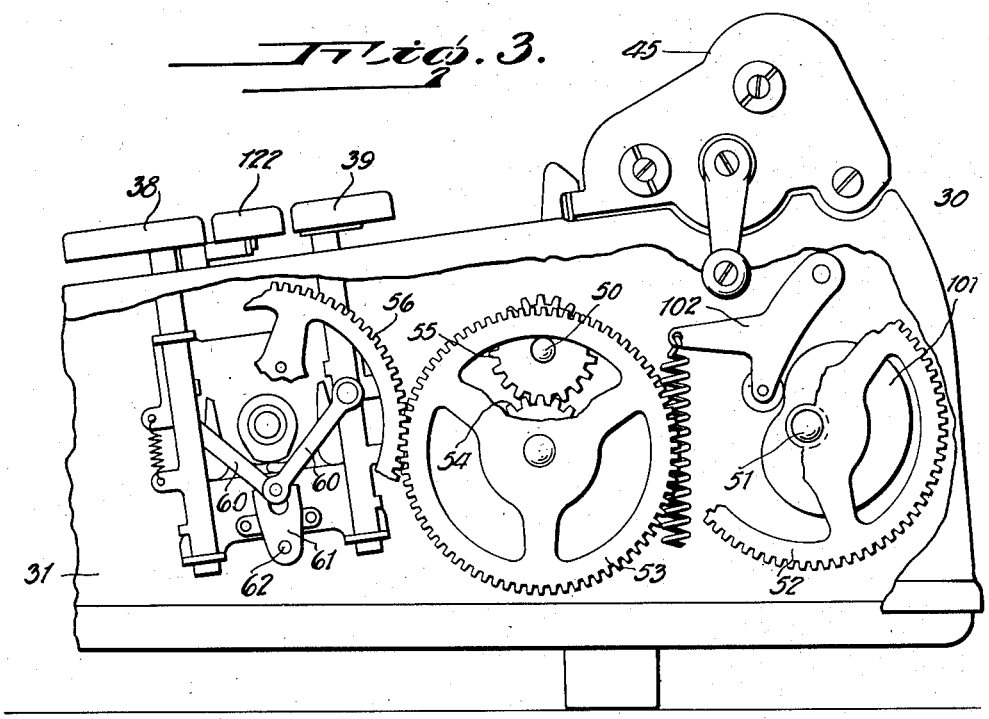
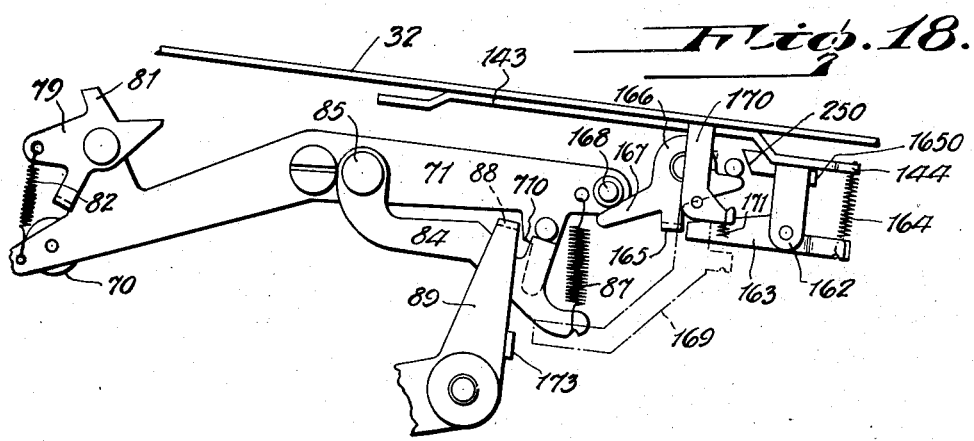
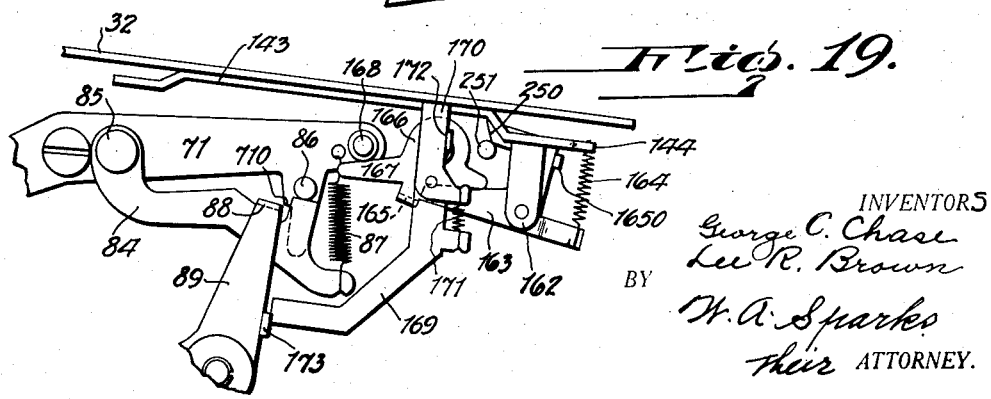
INVENTORS
George C. Chase
Lee R. Brown
BY H. A. Sparkes
their ATTORNEY.

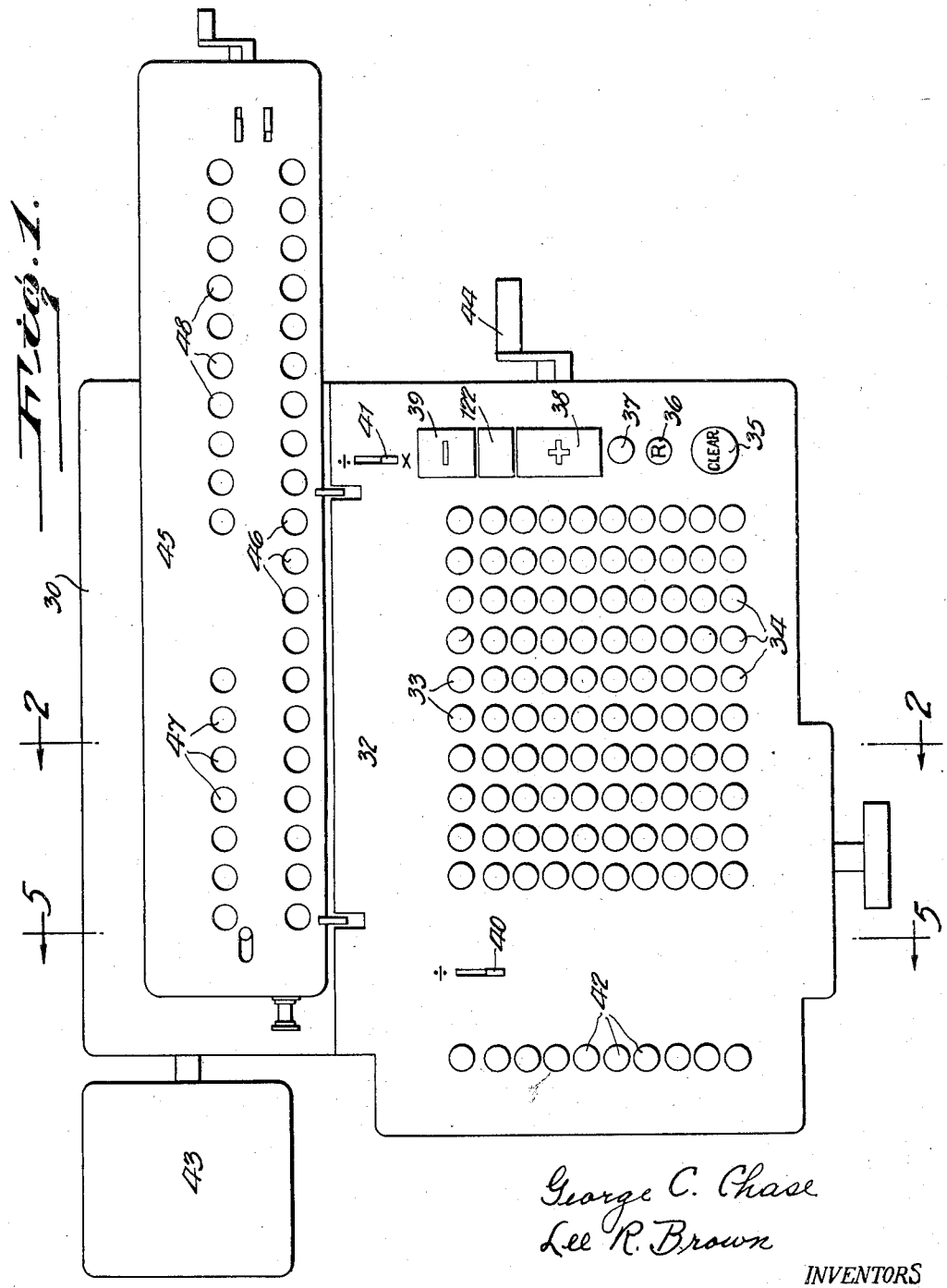

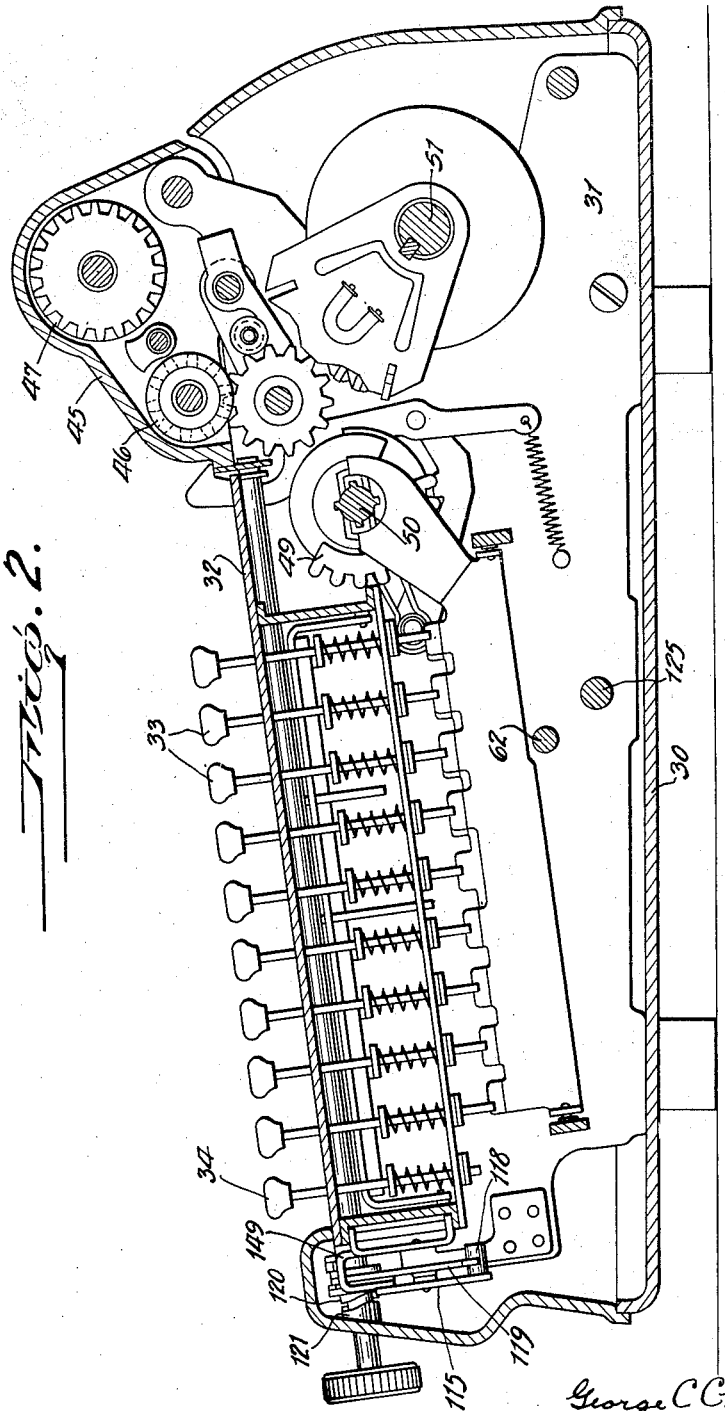

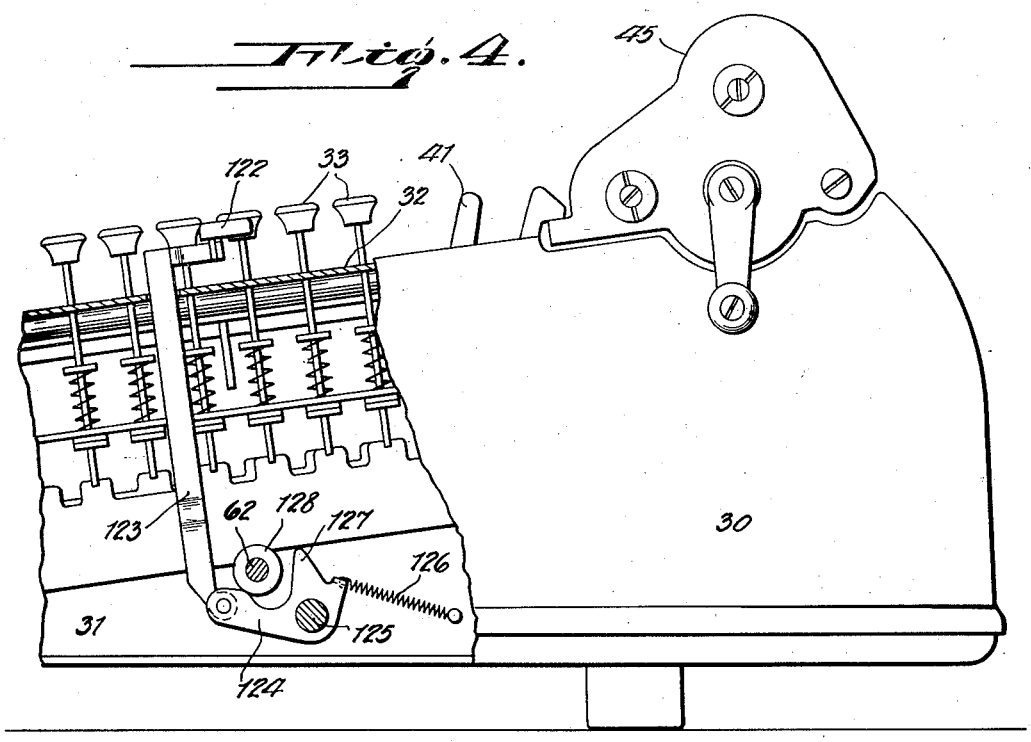
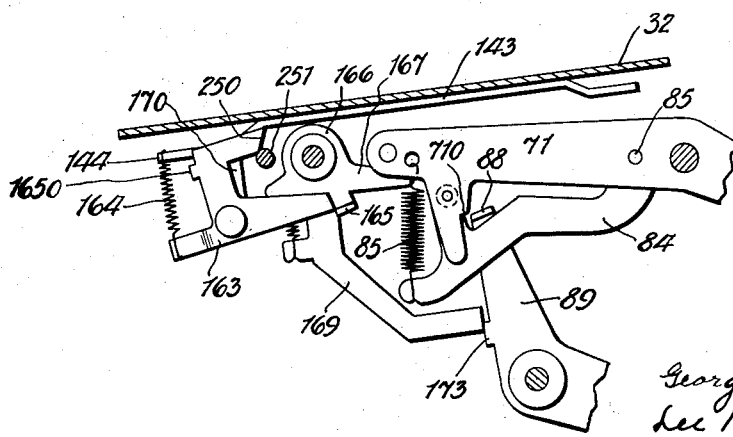

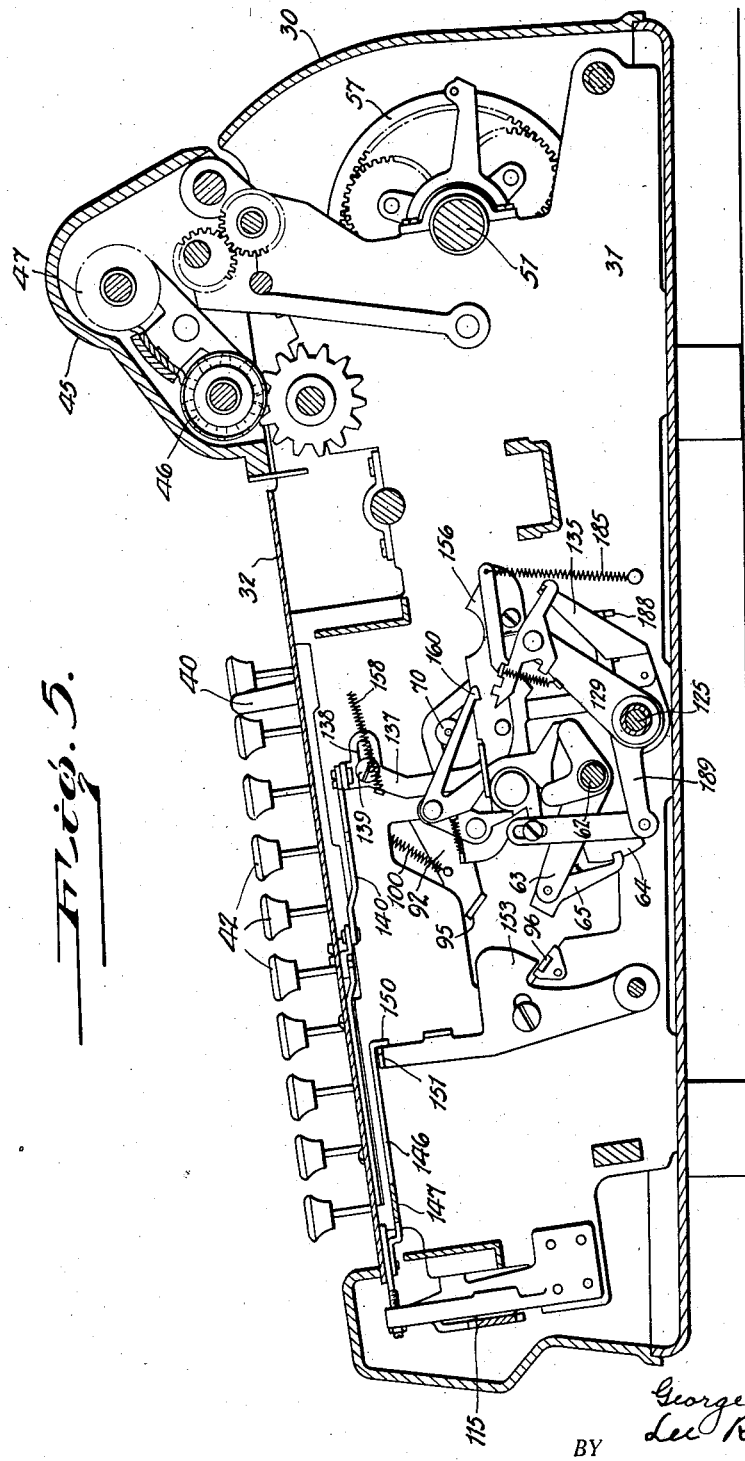

Dec. 1, 1931.    G. C. CHASE ET AL    1,834,121
CALCULATING MACHINE
Filed Nov. 20, 1929    10 Sheets-Sheet 6
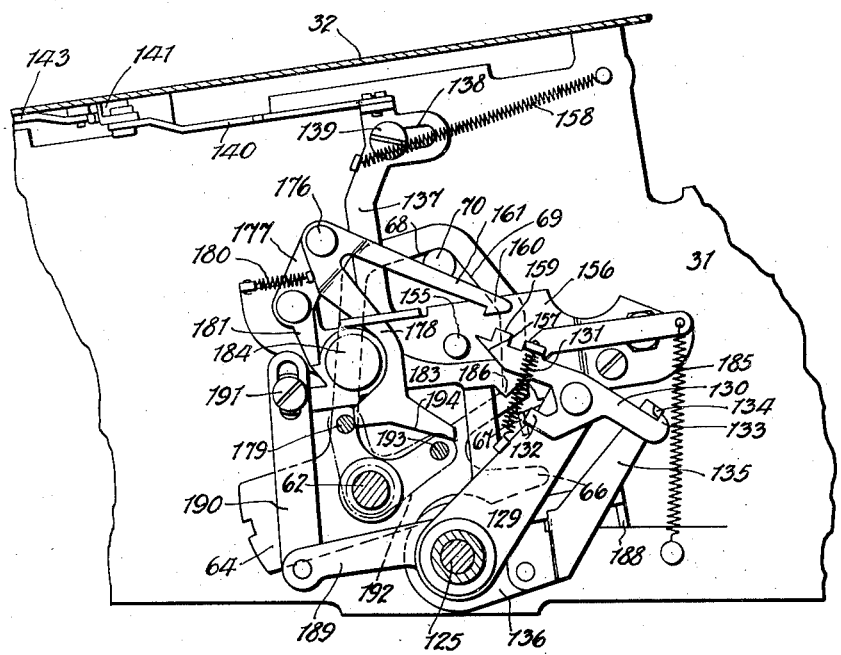
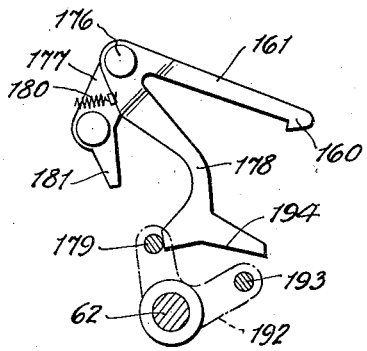
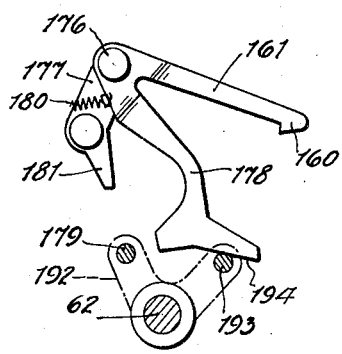
INVENTORS
George C. Chase
Lee R. Brown
BY
H. A. Sparks
Their ATTORNEY.

Dec. 1, 1931.   G. C. CHASE ET AL   1,834,121
CALCULATING MACHINE
Filed Nov. 20, 1929   10 Sheets-Sheet 7

George C. Chase
Lee R. Brown
INVENTORS

BY W. A. Sparks
Their ATTORNEY

Dec. 1, 1931.  G. C. CHASE ET AL  1,834,121
CALCULATING MACHINE
Filed Nov. 20, 1929   10 Sheets-Sheet 8

INVENTORS
George C. Chase
Lee R. Brown
BY
W. A. Sparks
Their ATTORNEY.

INVENTORS
George C. Chase
Lee R. Brown
H. A. Sparks
BY
Their ATTORNEY.

Patented Dec. 1, 1931

1,834,121

UNITED STATES PATENT OFFICE

GEORGE C. CHASE, OF SOUTH ORANGE, AND LEE R. BROWN, OF EAST ORANGE, NEW JERSEY, ASSIGNORS TO MONROE CALCULATING MACHINE COMPANY, OF ORANGE, NEW JERSEY, A CORPORATION OF DELAWARE

CALCULATING MACHINE

Application filed November 20, 1929. Serial No. 408,545.

This invention relates to calculating machines and particularly to carriage shifting mechanism for such machines, and one of the objects of the invention is to provide a carriage-shift key whereby the accumulator carriage may be moved to different columnar positions by means of the machine-operating motor.

Another object is to provide such a key in convenient position to be operated simultaneously with the plus or minus bar.

Another object is to provide means whereby when the carriage-shift key and the plus or minus bar are concomitantly operated, the carriage shift will not occur until release of the plus or minus bar.

Another object is to provide a carriage shift mechanism settable by a special key and operable upon the return to normal of the shift controlling key whether such controlling key be the plus bar, the minus bar or the special key alone.

Other objects will appear from the following description and will be pointed out in the appended claims. We attain all of these objects by the means shown in the accompanying drawings, in which:

Fig. 1 is a diagrammatic top plan view of a machine embodying the invention.

Fig. 2 is a vertical sectional view taken substantially on line 2—2 of Fig. 1.

Fig. 3 is a fragmentary right-hand side elevation with parts broken away for clearness.

Fig. 4 is a similar view with part of the right-hand side-frame removed.

Fig. 5 is a vertical sectional view taken substantially on line 5—5 of Fig. 1 with parts removed for clearness.

Fig. 6 is a view of certain parts of Fig. 5 shown on an enlarged scale and in normal position.

Fig. 16 shows certain parts as operated by the plus bar.

Fig. 17 is a similar view showing the parts as operated by the minus bar.

Fig. 18 is an enlarged detail elevation of certain parts shown in Fig. 11.

Fig. 19 is a similar view showing parts in operated position.

Fig. 20 is a view similar to Fig. 19 but looking from the opposite side.

Like characters of reference refer to like parts in all views.

Figure 8:
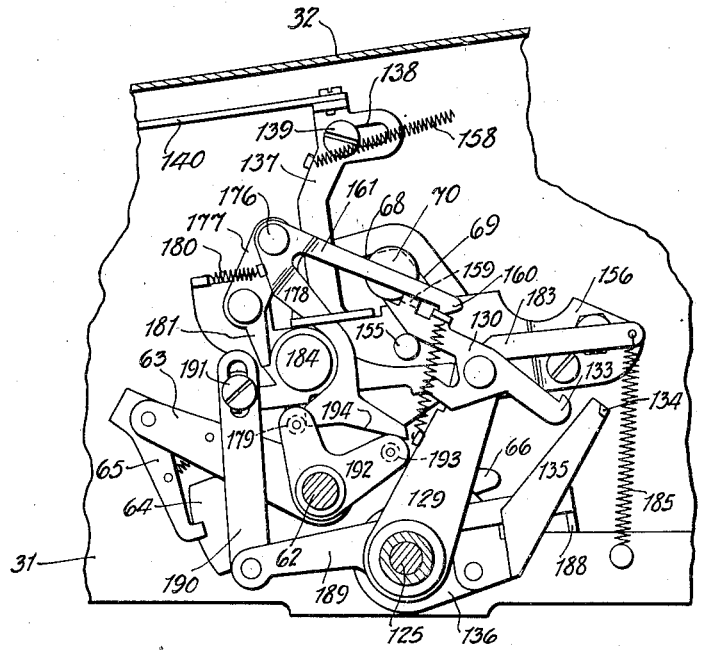
Fig. 8 is a similar view showing the parts in the position assumed upon fully depressing the carriage-shift key.
Figure 7:
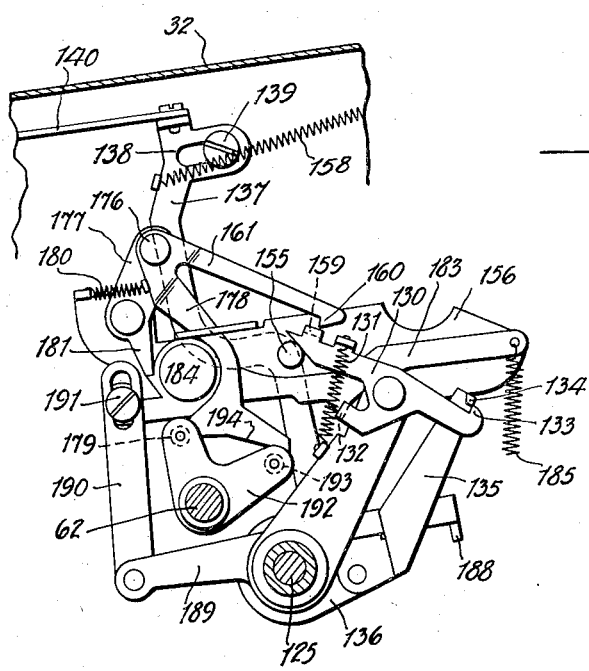
Fig. 7 is a similar view showing the parts in position just prior to release of the carriage-shift setting-device.

In these drawings the invention is shown as applied to a calculating machine constructed in accordance with the disclosure of Patent No. 1,566,650, issued to George C. Chase, Dec. 22, 1925, as modified by Patent No. 1,664,661 issued to George C. Chase, entitled Full cycle positioning mechanism, application Ser. No. 79,811, George C. Chase inventor, filed Jan. 7, 1926, entitled, Automatic control for calculating machines, and Patent No. 1,773,025, George C. Chase inventor, issued Aug. 12, 1930, Carriage-shift control for calculating machines.

General (Figs. 1, 2, 3, and 11)

Referring to the drawings in detail, 30 represents the casing and 31 the framework of a calculating machine. By way of illustrating the application of our invention, we have chosen to show the same as incorporated in a calculating machine of the well-known Monroe construction, although this is to be considered as merely illustrative, the invention being applicable to machines of various types. The controlling, actuating and clearing mechanism for the Monroe type of machine is fully set forth in the U. S. patent to G. C. Chase No. 1,566,650, and the pending application of E. F. Britten, Jr., Ser. No. 337,073, filed Feb. 2, 1929, and disclosures therein referred to, to all of which reference may be had for a complete disclosure of such mechanism.

The keyboard frame is shown at 32 and guides a plurality of manipulative members as follows: digit setting keys 33, zero keys 34, keyboard clearing key 35, repeat key 36, non-repeat key 37, add operating key or plus bar 38, subtract operating key or minus bar 39, division lever 40, counter rotation-reversing shift lever 41, and multiplying keys 42. A driving motor is shown at 43, a hand operating crank at 44, and a carriage at 45. The carriage 45 carries a plurality of accumulators 46 and two sets of counters indicated at 47 and 48, the counters 47 being of the "nineteen point" type (having no carrying mechanism and each bearing the nine significant digits running in reverse directions from a common zero, one set of significant digits being colored differently from the other), and the counters 48 being of the usual "ten-point" type with carry mechanism.

The direction of rotation of the accumulators and counters 46, 47 and 48 is controlled by the manipulative members 38, 39, 40 and 41, the latter serving merely to reverse driving of the counters and not of the accumulators.

*Registering means*

(Figs. 1, 2, 3, 5, 6, 11 and 18)

According to the present disclosure, and as more fully set forth in the patent above referred to, amounts set up on the keys 33 and thereby on the differential actuating gears 49 (Fig. 2) are registered upon numeral wheels 46 by the operation of the differential gear shaft 50 and of shaft 51 whereon the tens carry members are mounted, these shafts being connected by a train of one-to-one ratio gearing 52, 53, 54, 55 (Fig. 3). The hand crank 44, operating a gear 56, meshing with gear 53 of said train, is retained herein as an alternative means of operation, motor 43 being however the recognized means of operation.

The motor driving means is illustrated as substantially the same as that disclosed in the Chase Patent No. 1,566,650, motor 43 having driving connection with a planetary gear mechanism, the gear members 57 and 58 of which normally rotate idly but may be selectively arrested by means of the reversing clutch lever 59, to drive the third member of the differential, connected with shaft 51, forwardly or reversely, respectively.

Figure 11:
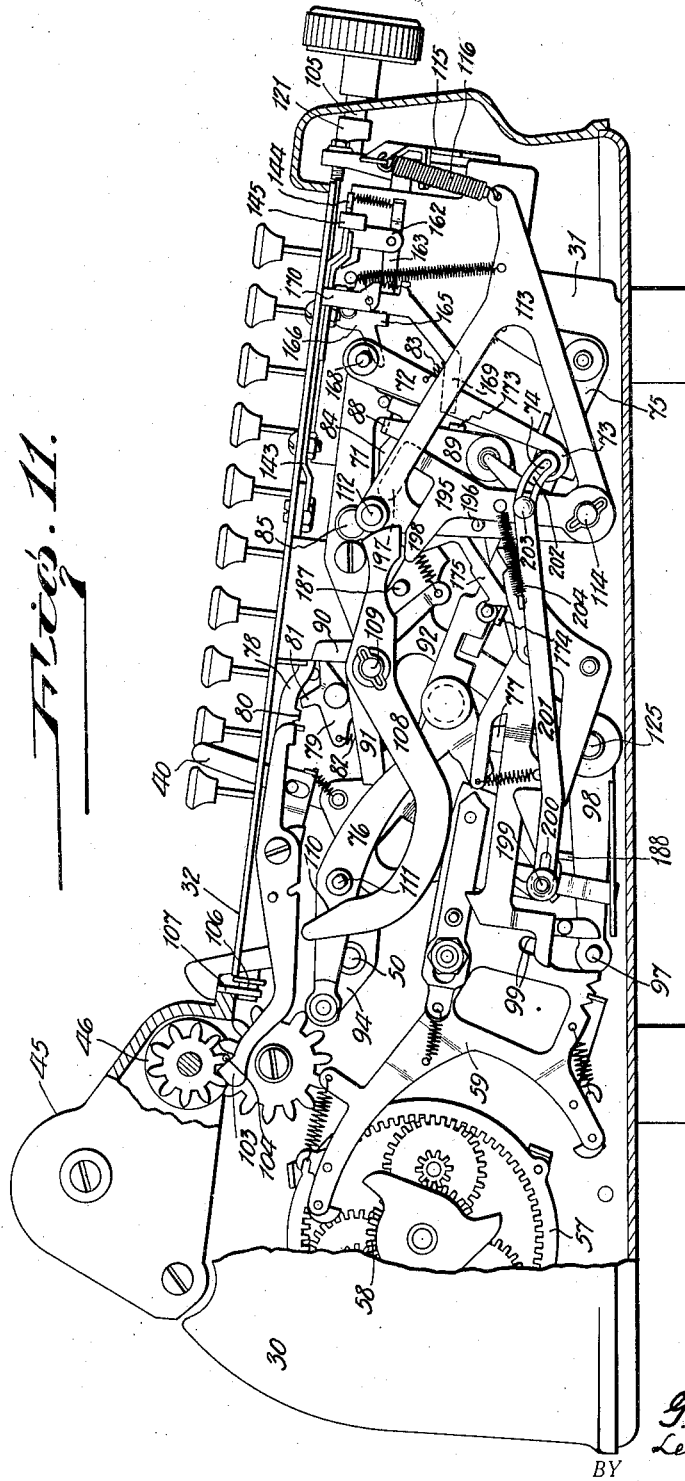
Fig. 11 is a left-hand side elevation with the casing broken away.
Figure 12:
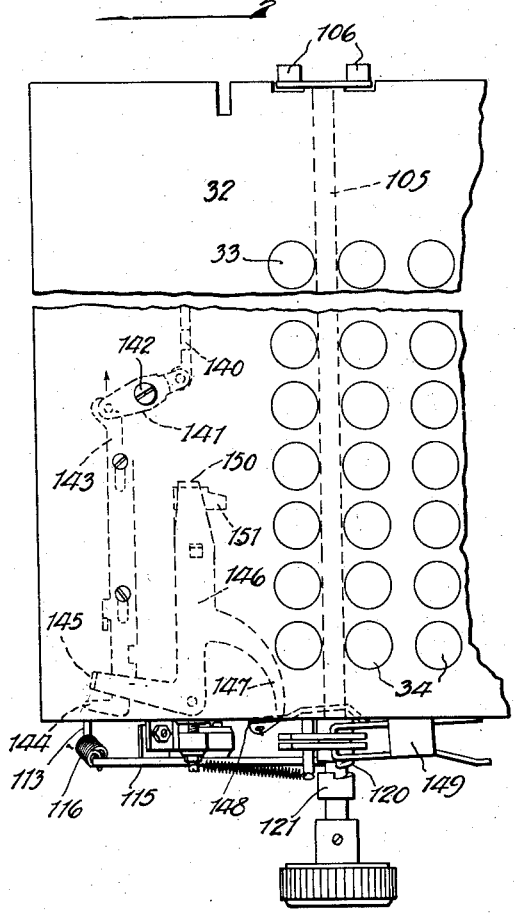
Fig. 12 is a fragmentary top plan view showing the setting mechanism for carriage-shift clutch in normal position.
Figure 13:
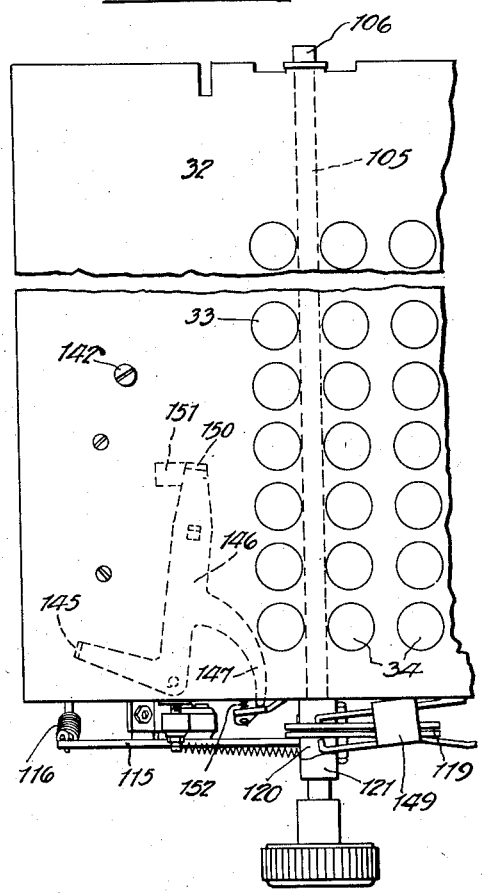
Fig. 13 is a similar view showing parts locked in operated position.
Figure 14:
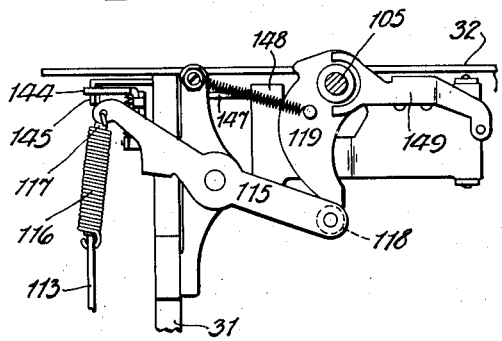
Fig. 14 is a front elevation of parts shown in Fig. 12 with parts broken away.
Figure 15:
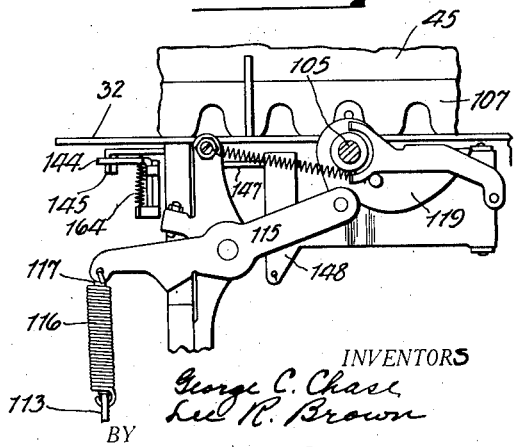
Fig. 15 is a similar view of the parts as shown in Fig. 13.

Motor operation is controlled by means of an add key 38 and a subtract key 39, (Figs. 1, and 3), each having link engagement 60 with an arm 61 of rock shaft 62, said shaft having at its opposite end an arm 63 connected with a setting lever 64 by means of coupling 65. Lever 64 is provided with a recess 66, between the walls of which lies a lug 67 of reversing clutch lever 59. Depression of the add or subtract key will therefore rock lever 59 in the one or the other direction and effect additive or subtractive operation of the machine. Before the clutch is engaged, the movement of lever 64 will unlock the actuating mechanism of the machine in the following manner: Oppositely inclined cam faces 68 and 69 of setting lever 64 (Fig. 6) are adapted to depress an anti-friction roller 70, mounted upon the rearward arm of releasing lever 71 (Fig. 11). The forward arm of lever 71 is provided with a depending pivoted link 72 (Fig. 11) having an angularly disposed or hook end 73, lying beneath pin 74 of a lock lever 75, so that rocking movement of lever 71 will raise lever 75 out of locking engagement with the end of link 76 of rock arm 77, hereinafter described.

Movement of lever 64 upon depression of the add or the subtract key will also set a member in position to trip the trigger 78 upon release of such key, so that at the end of a cycle suitable mechanism will be brought into action to bring the actuating mechanism to rest in full cycle position.

This member comprises releasing pawl 79, pivotally mounted upon releasing lever 71, and having an arm normally lying in front of the forward edge of lug 80 of trigger lever 78. When roller 70 of lever 71 is depressed, the arm 81 of pawl 79 is disengaged from lug 80 and the pawl spring member 82 will bring said arm 81 to position beneath the lug 80. When the add or subtract key is released by the operator, spring 83 (Fig. 11) tends to restore releasing lever 71 to normal position. In order to insure completion of the movement of lever 71, an arm 84 (Fig. 18) is pivoted to lever 71 at 85, and is normally held in contact with a stop 86 by a spring 87 connecting the forward ends of lever 71 and arm 84. At each operation of the machine a finger 88 of a lever 89 rides onto arm 84 tensioning spring 87 so that spring 87 insures the return to normal of lever 71 when permitted. As lever 71 is restored the arm 81 of pawl 79 will contact with the lower face of lug 80 and lift trigger 78 from engagement with a lug 90 of stop element 91, pivotally mounted upon arm 92, the latter being rotated by its spring into position for engagement with shoulder 93 of rock arm 77. Arm 77 is connected to the shaft 50 of the differential actuating members 49, by link 76 and crank arm 94 of said shaft. Upon movement of crank 94 to dead center position, stop element 91 will drop into engagement with shoulder 93 and in the following rotation of the parts, arm 92 will be carried forwardly with arm 77 until a suitable lug 95 of the arm 92 is brought into contact with a stationary stop member 96. During this movement of arm 92 a pin 97 mounted upon a rearward extension 98 of said arm will engage one of the oppositely inclined cam faces 99 of reversing clutch lever 59 to move the latter to neutral position, whereby the actuating mechanism is released by the action of the motor. Arm 92 having contacted with stop 96, the rebound of the parts and the action of spring 100 will restore crank arm 94 to dead center position, restoring stop element 91 to restrained position and locking the actuating mechanism by means of lever 75, all as fully described in the above-noted patents and applications. A locator cam 101 and spring pressed arm 102 (Fig. 3) assist in centralizing the actuating mechanism as it is brought to rest.

It will be evident from the above that addition and subtraction are performed by a momentary depression of the corresponding key. Multiplication is performed by holding down add key 38 until a number of cycles of operation have been made corresponding to the value of the digit of the multiplier. In division, quotient figures may be automatically determined by the following method: The divisor set up on the keyboard 33 is subtracted from the dividend registered on the numeral wheels 46 once more than the number of times said divisor is contained in the corresponding portion of the dividend, a negative numeral wheel reading being obtained and the carry over mechanism of the machine providing for the registration of a series of nines upon numeral wheels 46 as far to the left as such carry over mechanism is provided. In other words, a transitional carry has occurred. This carry is utilized to stop the machine by means of a cam projection 103 of the rearwardly extending arm of trigger 78, said cam projection lying in the path of movement of the carry pin 104 of the numeral wheel 46 associated at the time with the highest order carry mechanism. Upon tripping of the stop member 91 the machine will be allowed to come to rest in spite of continued depression of the key, by the tripping of the coupling 65, as described in the Chase Patent 1,566,650 hereinbefore referred to. The operator will now release the subtract key and depress add key 38 and upon the first additive registration a second transitional carry will move the left hand numeral wheels from 9 to 0 registration, correcting the excessive subtraction, leaving the proper quotient registered on one of the wheels 46 and again stopping the machine.

Automatic carriage shift

(Figs. 11–15)

In performing addition and subtraction the numeral wheel carriage will usually be retained in the same position, while in multiplication and division the shifting of the carriage is necessary, and in order to provide for an automatic shifting in the latter operations means are provided whereby shaft 105, having the opposite crank pins 106 engaging serrations of a rack 107 located on the forward edge of the carriage 45, may be rotated by power derived from the motor 43, transmitted through the operation of arm 92 of the full cycle stop mechanism following an additive registration.

Push rod 108 is pivoted on arm 92 at 109, and has the rear cam face 110 engaging pin 111 mounted upon link 76, the forward end of said push rod 108 being adapted to push forwardly against roller 112 mounted on a lever 113. Lever 113 is fulcrumed at 114 to the framing 31 and its forward end is connected with an arm of carriage shifting lever 115 by means of spring 116 and spacer rod 117 and is provided at its free end with a roller 118, adapted to operate against carriage shifting cam 119, loosely mounted on shaft 105 and having a toothed hub clutch member 120, adapted for engagement with the teeth of the complementary clutch member 121, fast upon shaft 105.

When clutch members 120 and 121 are in engagement therefore, movement of arm 92 during a stopping operation following release of the add key, will bring pin 111 of link 76 into engagement with cam end 110 of the push rod and operate bell lever 113 to tension spring 116. Spring 116 in its elongation stores energy and utilizes the same more slowly in its operation of the carriage shifting lever 115. As roller 118 of the carriage shifting lever is carried upward, cam 119 is rotated about 90° counter-clockwise, as viewed in Figure 15, thereby raising the carriage and advancing it about one half of its step movement to the left. The momentum of the carriage and the force of gravity thereon is sufficient to complete its one step of movement.

Carriage shift key and connections

(Figs. 1–10)

All of the above mechanism is old and well known in one or another of the disclosures above referred to. We shall turn now to the mechanism which is new in the present construction and consider the same and its effects on the know parts above set forth.

In this connection, 122, Figs. 1 and 3 represents a carriage-shift key which is located between the plus and minus bars 38 and 39 and which is provided with a stem 123 guided in the keyboard frame and pivotally secured at its lower end to a rock-member 124, Fig. 4, which is rigidly secured to a shaft 125 rotatable in suitable bearings mounted in the frames 31. The rocker 124 is normally turned by a spring 126 into position to hold the shift key 122 elevated. A finger 127 coacts with a sleeve 128 on shaft 62 to limit the throw of shaft 125 by key 122.

Secured fixedly to the left-hand end of shaft 125 is a rock arm 129 to the free end of which is pivoted a pawl member 130. A spring 131 tends constantly to turn pawl 130 in a counter-clockwise direction, such movement being limited by a stop 132 engaging the arm 129. In normal position of pawl 130, a hook 133 formed on one end thereof engages the rear side of a lug 134 projecting laterally from a member 135 riveted to or formed integrally with a member 136 freely pivoted on shaft 125, as best seen in Fig. 6.

Member 136 is provided with an upwardly extending arm 137 which is formed with a slot 138 embracing a pin 139 secured to the left-hand main frame. The pin 139 and slot 138 merely guide arm 137 in its movements. The upper end of arm 137 is bent over and pivotally secured to the rear end of a forwardly extending link 140, which in turn has its front end pivotally connected to one arm of a lever 141 pivoted at 142 to the keyboard frame 32. The other arm of lever 141 is provided with a slot and pin connection to the rear end of a slide member 143 slidably secured to the underside of the keyboard frame 32. The forward end of this slide 143 is formed with a finger 144 which extends in front of a finger 145 of a clutch-shifting bell-crank 146. The bell crank 146 is formed with a finger 147 arranged in rear of an arm 148 of a shipper-lever 149 which controls clutch member 120.

It will now be seen that depression of the carriage-shift key 122 will cause member 124 to rock shaft 125 whereby rock arm 129 will be rocked counter clockwise (as viewed from the right), and pawl 130 will carry with it members 135 and 136. This will effect counter-clockwise rotation of arm 137 and a consequent forward movement of link 140, rocking of lever 141, rearward movement of slide 143, rocking of lever 146, and shipper lever 149 and movement of clutch member 120 into engagement with clutch member 121.

The rear end of bell-crank 146 is formed with a downwardly bent finger 150 which is adapted to be engaged and locked by a spring-pressed member 151 (Figs. 5, 12 and 13) so as to hold the clutch in set position. A spring 152 returns shipper-lever 149 and bell-crank 146 to normal when released from locking member 151. The locking member 151 is provided with a lug 153 contacted by finger 95 of member 92 at each operation of the latter, which it will be remembered is at the close of the last cycle of each operation.

The member 135 is released at the end of the down stroke of the shift key 122 and members 136, 137, 140, 141 and 143 return to their normal position leaving the clutch locked in operation condition. The means for effecting this release include a pin 155 projecting from a stationary bracket 156, upon which pin an inclined cam face 157 of pawl 130 rides. As the arm 129 is turned by the depression of shift key 122, the cam face 157 rides up on the pin 155 and near the end of this movement and after bell-crank 146 has been locked, the hook 133 is disengaged from lug 134 and the parts mentioned are returned to normal under the impulse of a spring 158. As the pawl 130 rides up pin 155 a finger 159 of said pawl is brought in front of a hook 160 on a member 161 for purpose to be later set forth.

*Depression of the shift key unlocks the machine*

(Figs. 11, 18, 19 and 20)

The slide 143 is formed with a downwardly extending finger 162 to which is pivoted a pusher member 163 held in normal position by a spring 164 and stop finger 1650. The rear end of pusher 163 stands in front of a bent-over finger or shoulder 165 of a rock member 166 having a finger 167 extending under the pivot 168 of lifting arm 72. An arm 169 is pivoted to a bent down finger 170 of slide 143 and is held in normal position by a spring 171 and stop 172, in which position its free end is in front of a bent over finger 173 on arm 89.

When the shift key is depressed, and slide 143 is moved rearwardly, pusher 163 engages shoulder 165, rocking member 166 and thereby lifting pivot 168. This begins to rock lever 71 and at the instant that finger 81 of pawl 79 snaps below finger 80, the finger 88 of member 89 moves forwardly under a shoulder 710 (Fig. 18) formed on the lever 71 so as to lock the latter against return unless the shift key is fully depressed. Further lifting of the pivot 168 raises the arm 72 thereby lifting locking member 75 until its finger 174 is above latch 175 by which it is engaged and held. At the same time, arm 169 engages finger 173 and moves arm 89 from under the shoulder 710 as shown in Fig. 19. As before described, the full depression of the shift key effects release of the slide 143 which returns to normal, whereupon lever 71 rocks back to normal, but in doing so, pawl 79 raises latch 78 permitting member 91 to move into engagement with shoulder 93. Upon the movement of slide 143 to its rearmost position, a cam 250 of pusher 163 rides up on a stationary pin 251, rocking member 163 so that its rear end rises above finger 165 releasing member 166.

Figure 9:
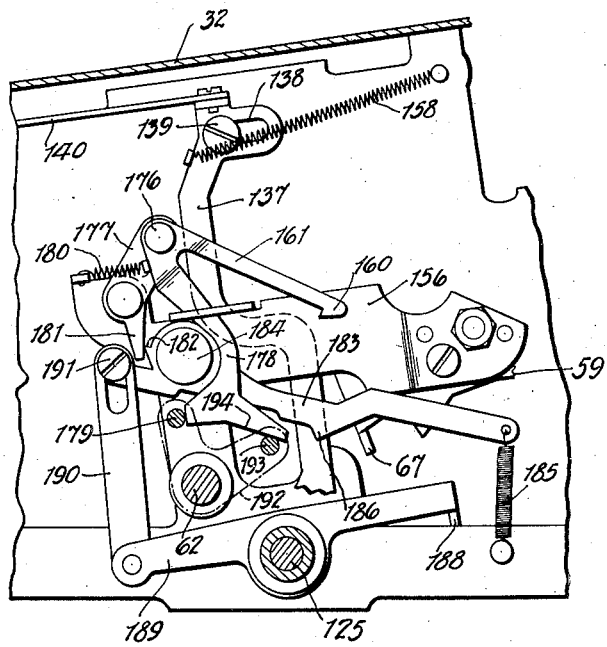
Fig. 9 is a view showing the hammer mechanism as operated by release of the carriage-shift key.
Figure 10:
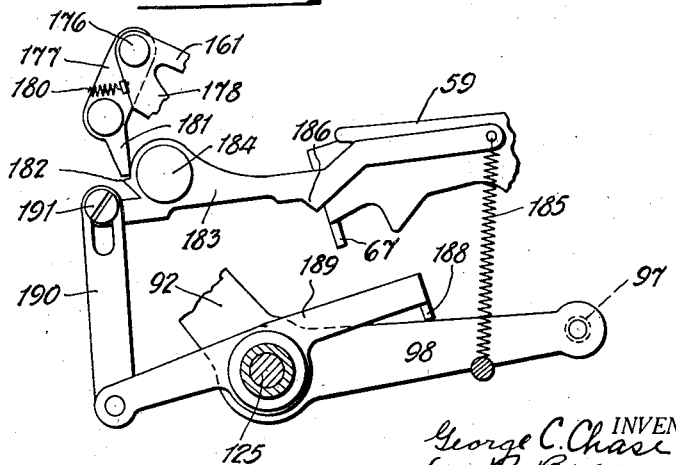
Fig. 10 is a similar view showing the hammer being reset.

Release of shift key shifts carriage (Figs. 6, 9 and 10)

Means are provided whereby release of the shift key (when neither the plus nor minus bar is depressed), will effect carriage shifting.

Upon depression of the shift key, it has been described that pawl 130 moves its finger 159 in front of hook 160 on lever 161. This lever is pivoted at 176 to one end of a rock lever 177 and has a depending arm 178 normally resting against a pin 179. A spring 180 rocks lever 177 so as to normally engage its stop finger 181 with a stop shoulder 182 formed on a hammer 183 pivoted at 184 to the stationary bracket 156. This hammer 183 extends rearwardly in the machine and is constantly under the tension of a spring 185. The hammer is formed with a cam 186 adapted to strike the extended end of finger 67 of the lever 59 and move the same to operative position upon release of the hammer.

If the shift key 122 has been depressed (without depressing either the plus or minus bar), the release of the shift key will cause pawl 130 to draw hook 160 rearwardly, thereby rocking lever 177 to release the hammer 183. The hammer will then move under impulse of spring 185 and cause lever 59 to shift into what would ordinarily be adding position. This causes crank 94 to attempt an additive rotation so that the pusher 108 is moved forwardly and the carriage is shifted; but as member 91 was rendered effective upon depression of the shift key, only a partial cycle will occur, the arm 92 striking against buffer 96, and the pin 97 again centralizing lever 59. During this time a pin 187 carried by member 92 strikes latch 175 and releases the locking member 75.

The hammer is also reset at this time, this being accomplished by the centralizing arm 98. Extending over centralizing arm 98 is a finger 188 (Fig. 10) bent over from the rear end of a lever 189 pivoted loosely on shaft 125 and pivotally connected at its front end to the lower end of a link 190 which has a pin-and-slot connection at 191 to the hammer 183. When centralizing arm 98 rocks to centralize lever 59 it also raises finger 188 drawing down link 190 and resetting the hammer 183 with shoulder 182 under stop 181.

Operation of plus and minus bars disconnects the hammer devices (Figs. 6, 16 and 17)

When either the plus or minus bar 38 or 39 is depressed, the shaft 62 is rocked. Secured to shaft 62 so as to be rotated thereby is a member 192 carrying the pin 179 above mentioned and also a pin 193. As already described, the depending arm 178 of latch 161 stands in rear of pin 179 and when the plus bar 38 is operated, this pin 179 will move arm 178 rearwardly moving hook 160 out of cooperative relation with pawl 130. Likewise when the minus bar 39 is depressed, the pin 193 will be rocked against a cam face 194 of arm 178 and will move the hook 160 to ineffective position. In this manner it is assured that when the carriage shift key and the plus or minus bar are simultaneously in depressed position, the carriage will not be shifted until the plus or minus bar is released, regardless of whether the shift-key is first released or not.

The minus key and the carriage shift (Fig. 11)

Means are provided herein whereby after depression of the minus bar and the carriage shift key, the carriage will be automatically shifted upon release of the minus bar.

Pivoted upon the stud 114 is an upright arm 195 which normally stands against a stop pin 196. Arm 195 carries a guide finger 197 which holds it in fairly close relation to bell-frame 113. The arm 195 is formed with a stop-face 198 directly under the front end of pusher 108. When the machine is operated by depressing the minus bar 39 and the carriage shift key 122, the latter causes setting of the carriage shift clutch. When, thereafter, the minus bar 39 is released, the arm 92 moves forwardly as previously described, and carries pusher bar 108 with it. While pin 111, during a negative operation, cannot hold pusher 108 against mere rocking, the face 198 prevents such rocking, and the bell-frame 113 is pushed by bar 108.

The intended mode of operation contemplates the release of the shift key before the release of the plus or minus bar in operations where the plus or minus bar and shift key are simultaneously in depressed position.

During operations where the carriage shift key and plus bar are simultaneously in depressed position, the operation is the same as when the minus bar and shift key are used except that the pin 111 moves so as to insure against rocking of push bar 108.

Automatic division (Figs. 1 and 11)

Full automatic division is performed in this type of machine in a well-known manner. Such action of the machine is effected by pressing lever 40 rearwardly. The operation involves reverse or subtractive operation of the machine until the divisor (set up on the keyboard) has been subtracted from the cooperative portion of the wheels 46 (containing the dividend) once more than the divisor is contained in that portion of the dividend. This causes a reversing of the cycle for one adding cycle whereupon the carriage is shifted and the cycle is reversed to subtraction. This is known in the art as the "subtract-add-shift" method of division. In this method of division it is necessary that the carriage should shift only after adding cycles. Consequently means are provided for rendering arm 195 ineffective upon throwing lever 40 to division position.

The division lever 40 carries near its lower end a pin 199 which extends thru a slot 200 in a link 201, said link being formed at its front end with a slot 202 thru which passes a pin 203 carried by arm 195. A spring 204 tends constantly to hold arm 195 with pin 203 in the rear end of slot 202. When the lever 40 is shifted to division position pin 199 is moved forwardly carrying link 201 with it and moving arm 195 so that its face 198 is moved forward until it can no longer prevent rocking of pusher 108. Thus when full automatic division is performed, no carriage shift will occur at the end of subtractive cycles, but pin 111 enforces carriage shifting at the end of additive cycles.

The clutch for shifting the carriage during automatic division is not the one set forth herein, but this and other mechanisms of the automatic division device are set forth in the hereinbefore mentioned disclosures.

While we have described what we consider to be the most desirable embodiment of our invention, it will be obvious that many changes and substitutions of equivalent elements could be made without in any way departing from the spirit of our invention. We, therefore, do not limit ourselves to the exact embodiment herein shown and described nor to anything less than the whole of our invention as hereinbefore set forth and as hereinafter claimed.

We claim:

1. In a calculating machine, the combination of a keyboard for setting up amounts to be registered, a register, mechanism controllable by said keyboard and operable for effecting registration on said register, a carriage supporting said register and movable from one denominational position to another, means for automatically shifting the carriage from one denominational position to another and including a clutch and clutch-operating mechanism, a carriage-shift key operatively associated with said means for effecting setting of said clutch upon movement of said key from normal position and for effecting operation of said clutch-operating mechanism upon the return of said key to normal position, and an operating key for effecting operation of the first said mechanism and operatively associated with said carriage-shift key for rendering the return movement of the latter ineffective as to said clutch-operating mechanism while said operating key is in effective position and for delaying operation of said clutch-operating mechanism until said operating key returns to normal ineffective position.

2. In a calculating machine, the combination of a keyboard for setting up amounts to be registered, a register, mechanism controllable by said keyboard and operable for effecting registration on said register, a carriage supporting said register and movable from one denominational position to another, means for automatically shifting the carriage from one denominational position to another and including a clutch and clutch-operating mechanism, a carriage-shift key operatively associated with said means for effecting setting of said clutch upon movement of said key from normal position and for effecting operation of said clutch-operating mechanism upon the return of said key to normal position, a pair of operating keys, one operable for effecting additive and the other subtractive operation of the first said mechanism and each operatively associated with said carriage shift key for rendering the return movement of the latter ineffective as to said clutch-operating mechanism while either of said operating keys is in effective position and for delaying operation of said clutch-operating mechanism until either effective operating key returns to normal ineffective position, said operating keys being arranged in juxtaposition to said carriage-shift key so that either of said operating keys may readily be simultaneously depressed with said carriage-shift key.

3. In a calculating machine, the combination with actuating means and accumulating mechanism operable thereby, of a transversely shiftable carriage supporting said accumulating mechanism, a carriage-shift key, a normally ineffective carriage-shift clutch, and means operable by said key for engaging said clutch without effecting shifting of said carriage, an operating key for said actuating means, and means operable upon release of said last named key for effecting the shift through the clutch so engaged.

4. In a calculating machine, the combination of a transversely shiftable carriage, accumulators mounted thereon, differential actuators for said accumulators, carriage shifting mechanism, a carriage-shift key, a member operable by said key for effecting setting of said carriage shifting mechanism upon depression of said key, means operable by said member upon its return to normal for effecting carriage shifting operation of said carriage shifting mechanism and mechanism operable for moving the last said means out of operable relation with said member.

5. In a calculating machine, the combination of a transversely shiftable carriage, accumulators mounted thereon, differential actuators for said accumulators, carriage shifting mechanism, a carriage-shift key, a member operable in one direction by depression of said key and in the other direction upon the release of said key, a second member operable by the first said member upon depression of said key for setting said carriage shifting mechanism, means for effecting disengagement of said members upon the completion of the depression of said key, and a third member operable by the first said member upon the return movement of the first said member for effecting operation of said carriage shifting mechanism.

6. In a calculating machine, the combination of a transversely shiftable carriage, accumulators mounted thereon, differential actuators for said accumulators, carriage shifting mechanism, a carriage-shift key, a member operable in one direction by depression of said key and in the other direction upon the release of said key, a second member operable by the first said member upon depression of said key for setting said carriage shifting mechanism, a third member operable by the first said member upon the return movement of the first said member for effecting operation of said carriage shifting mechanism, a plus operating key, a minus operating key, and means operable by either of said operating keys for moving said third member out of operative relation with the first said member.

7. In a calculating machine, the combination of a transversely movable carriage, accumulators mounted thereon, differential actuators for said accumulators, operating mechanism for said differential actuators and including a clutch, a motor adapted to be operatively connected to said operating mechanism by said clutch, means for operating said clutch to drive said operating mechanism in reverse directions at the will of the operator, means operable by said operating mechanism for effecting shifting of said carriage upon the conclusion of an operation of said operating mechanism in either direction, and a device for rendering the last said means ineffective during operation of said operating mechanism in one direction.

8. In a calculating machine, the combination of a transversely movable carriage, accumulators mounted thereon, differential actuators for said accumulators, operating mechanism for said differential actuators and including a clutch, a motor adapted to be operatively connected to said operating mechanism by said clutch, means for operating said clutch to drive said operating mechanism in reverse directions at the will of the operator, means operable by said operating mechanism for effecting shifting of said carriage upon the conclusion of an operation of said operating mechanism in either direction, a finger-piece operable for causing said machine to effect full automatic division, and a device operable by said finger-piece for rendering the last said means ineffective during operation of said operating mechanism in one direction.

9. In a calculating machine, the combination of a register, a shiftable carriage supporting said register, differential actuating mechanism for said register, operating mechanism for said actuating mechanism, means for normally locking said operating mechanism, a full-cycle stop mechanism including a member settable for operation by said operating mechanism, and a carriage-shift key operable upon its movement from normal position to effect release of said operating mechanism from the locking means and setting of said member, and operable upon its return to normal for effecting operation of said operating mechanism for effecting denominational shifting of said carriage.

10. In a calculating machine, the combination of a register, a shiftable carriage supporting said register, differential actuating mechanism for said register, operating mechanism for said actuating mechanism, means for normally locking said operating mechanism, a full-cycle stop mechanism including a member settable for operation by said operating mechanism, carriage shifting mechanism including a member settable for operatively relating the carriage shifting mechanism and the full-cycle stop mechanism, and a carriage-shift key operable upon its movement from normal position to effect release of said operating mechanism from the locking means and setting of said members, and operable upon its return to normal for effecting operation of said operating mechanism for effecting denominational shifting of said carriage.

11. In a calculating machine, the combination with registering devices, a denominationally movable carriage, and normally ineffective operating mechanism, of carriage shifting devices including a clutch, a depressible carriage shift key, a rock shaft operable by said key, means operably by said shaft upon depressing said key to set said clutch without rendering said operating mechanism effective, and means operable by said shaft upon return of said key, for rendering said operating mechanism effective to drive said clutch and shift said carriage.

12. In a calculating machine, the combination with registering devices, a denominationally movable carriage, and normally ineffective operating mechanism, of carriage shifting devices including a clutch, a depressible carriage shift key, a rock shaft operable by said key, a pawl carried by said rock shaft, means operable by said pawl upon movement in one direction to effect setting of said clutch, and means operable by said pawl on its return to normal to render said operating mechanism effective.

13. In a calculating machine, the combination with registering devices, a denominationally movable carriage, and normally ineffective operating mechanism, of carriage shifting devices including a clutch, a depressible carriage shift key, a rock shaft operable by said key, a pawl carried by said rock shaft, means whereby said pawl may render said clutch effective upon movement in one direction, means for disconnecting said pawl from the clutch controlling means at the end of such movement, means operable by said pawl upon movement in the opposite direction for rendering said operating mechanism effective to effect carriage shifting, and a device operable by said operating mechanism to return the last said means to normal condition.

Signed at Orange, in the county of Essex and State of New Jersey.

GEORGE C. CHASE.
LEE R. BROWN.